United States Patent [19]

Askari et al.

[11] Patent Number: 5,498,681

[45] Date of Patent: Mar. 12, 1996

[54] MATERIAL FOR USE IN THE MANUFACTURE OF POLYMERIC ARTICLES

[75] Inventors: Syed H. Askari, Santa Clara; Hermann H. Neidlinger, San Jose; Khushroo Gandhi, Sunnyvale, all of Calif.

[73] Assignee: Pilkington Barnes Hind, Inc., Sunnyvale, Calif.

[21] Appl. No.: 391,265

[22] Filed: Feb. 21, 1995

Related U.S. Application Data

[63] Continuation of Ser. No. 177,451, Jan. 5, 1994, abandoned, which is a continuation-in-part of Ser. No. 10,183, Jan. 28, 1993, abandoned.

[51] Int. Cl.$^6$ .......................... C08F 246/00; C08F 18/20
[52] U.S. Cl. .......................... 526/246; 523/106; 524/520; 524/544; 351/160 R; 351/160 H
[58] Field of Search .......................... 526/246; 523/106; 524/520, 544; 351/160 R, 160 H; 525/937

[56] References Cited

U.S. PATENT DOCUMENTS

| | | | |
|---|---|---|---|
| 4,272,422 | 6/1981 | Tanaka | 524/566 |
| 4,578,504 | 3/1984 | Hammar | 560/112 |
| 4,594,401 | 6/1986 | Takahashi et al. | 60/652 |
| 4,638,040 | 1/1987 | Hammar | 526/245 |
| 4,820,747 | 4/1989 | Chen | 523/107 |
| 4,921,884 | 5/1990 | Hammar et al. | 523/106 |
| 5,362,768 | 11/1994 | Askari et al. | 523/106 |

FOREIGN PATENT DOCUMENTS

| | | |
|---|---|---|
| 0128701 | 12/1984 | European Pat. Off. . |
| 0294976 | 12/1988 | European Pat. Off. . |
| 0294515 | 12/1988 | European Pat. Off. . |
| 0495603 | 7/1992 | European Pat. Off. . |
| 02293817 | 12/1990 | Japan . |

OTHER PUBLICATIONS

Derwent Abstract 91–024932/04, Basic Abstracts Journal, Section CH, Week 9104, 27 Mar, 1991, Derwent Publications, Ltd., London, GB; class A, p. 368. JP2 293817.

*Primary Examiner*—Paul R. Michl
*Assistant Examiner*—John J. Guarriello
*Attorney, Agent, or Firm*—Burns, Doane, Swecker & Mathis

[57] ABSTRACT

Disclosed is a polymeric article at least a portion of which is manufactured from a hydrogel material having a hydration level of from between about 45% and 56% by weight, which hydrogel is formed from a xerogel which is a copolymer system that can be solvolyzed and hydrated and during which undergoes a linear expansion of from about −7% to about +7%. The polymeric article is comprised of a copolymer system comprising dichloroacetate ester of glyceryl acrylate, methacrylate and ethacrylate and one or more compatible ethylenically unsaturated monomers without such solvolyzable groups.

14 Claims, 1 Drawing Sheet

MATERIAL FOR USE IN THE MANUFACTURE OF POLYMERIC ARTICLES

CROSS-REFERENCE TO RELATED APPLICATIONS

This application is a continuation of application Ser. No. 08/177,451, filed Jan. 5, 1994, now abandoned, which is a continuation-in-part of U.S. patent application Ser. No. 08/010,183, filed Jan. 28, 1993 which application is incorporated herein by reference in its entirety.

BACKGROUND OF THE INVENTION

1. Field of the Invention

This invention is directed to the manufacture of polymeric hydrogel materials for use in ophthalmic devices and to the polymeric materials themselves both in the xerogel and hydrogel states.

2. State of the Art

Hydrogel materials are commonly used in the manufacture of what is commonly known as soft contact lenses. Hydrogel materials are a particular area of specialized chemistry and the material exhibits some unique properties. Generally, the hydrogel materials are copolymeric systems which are formed in the xerogel state where they are hard cross-linked materials. The xerogel in the presence of water hydrates and undergoes a change so that it attains the hydrogel state. Upon hydration, the resulting polymer composition contains water and, accordingly, becomes softer and more pliable as compared to the polymer composition prior to hydration.

It should be noted, however, that in the hydration of the xerogels the material (polymer) will undergo certain physical changes. Specifically, when the xerogel material is hydrated, the polymer undergoes considerable expansion/swelling (i.e., undergoes a volume increase). The exact amount of expansion is dependent upon several factors such as the nature and hydrophilicity of the polymer, the degree of cross-linking, and the like.

A majority of the known hydrogel materials used in contact lenses are cross-linked in structure including hydrogel materials based on hydroxyethylmethacrylate, a common component in hydrogel compositions used in contact lenses. Consequently, except for machining (e.g., lathing, cutting, etc.), these materials cannot be reshaped subsequent to polymerization. Moreover, these polymeric materials are cast in the xerogel state, and once hydrated become soft and pliable which makes machining these materials difficult. Accordingly, the final shape and other physical characteristics of the polymeric article are preferably formed during the xerogel state, i.e., prior to solvolysis and hydration.

As has been previously mentioned, the dimensions of the polymer changes upon hydration. Consequently, in the case of contact lenses and other ophthalmic devices where the proper dimensions of the hydrated product are essential to adequate performance of the product, the volume changes occurring during hydration have to be accounted for when forming/shaping the polymeric material in the xerogel state. As the volume changes increase upon hydration, so does the difficulty in accurately forming/shaping the polymeric material in the xerogel state so that upon hydration, the resulting hydrogel composition has the appropriate dimensions.

In addition to the above-mentioned problem regarding the volume change and the necessity of being able to accurately predict the dimensions of the product in the hydrogel state, there is also a problem in the fact that certain contact lens designs do not well tolerate significant volume change upon hydration. For example, the so-called SATURN® lens has a Rigid Gas Permeable (RGP) center with a concentric hydrogel skirt. This lens is fabricated with the concentric skirt in the xerogel form and hydrated after fabrication to the hydrogel form. However, the expansion/swelling of the skirt during hydration causes stresses at the boundary of the skirt and the RGP center as well as shape changes in the hydrogel skirt. This is because the RGP material is dimensionally stable and exhibits little, if any, expansion during hydration whereas the skirt material does. Consequently, there is differential expansion in the two materials and it is this differential expansion which causes stresses at the boundary of the skirt and the RGP center as well as the shape changes discussed above.

The need to compensate for swelling of polymeric materials during hydration is recognized in the art. For example, U.S. Pat. No. 4,093,361 describes the preparation of a hydrogel material which exhibits no net volume change upon hydration. In this case, polymerization of the monomer is conducted in the presence of a non-reactive water soluble neutral filler material. After polymerization is complete, the neutral filler material is washed out with a solvent thereby providing space for hydration of the polymer while leaving the final dimensions of the hydrogel unchanged from the xerogel state. Polymers made in this way, however, suffer the disadvantage that parameters such as hardness become unsatisfactory and the mechanical properties (e.g., modulus, tear strength, maximum elongation) of the hydrated resulting polymer are no longer optimum.

Additionally, European Patent Application Publication No. 0 495 603 A1 describes a process for providing a broad solution to the above-noted problems. Specifically, in this particular case, the hydrogel copolymer system is formed from two or more monomers of a first group and one or more monomers of a second group. The monomers of the first group each have one or more substitutable bulky leaving groups which can be removed by solvolysis to expose a hydratable moiety (e.g., a hydroxyl group) whereas the monomers of the second group do not.

After polymer formation, the leaving groups are readily removed in the presence of a mild base such as aqueous ammonium hydroxide and during subsequent hydration of the xerogel, the volume change resulting during hydration is controlled to from about 20 percent shrinkage to 40 percent expansion by controlling the make-up of the comonomer units and the size of the leaving groups. That is to say that the use of at least two different monomers having solvolyzable leaving groups permits some control over the volume change during hydration by the selection of the relative size of the leaving group, by the selection of the amounts of the two or more monomers relative to each other, and by the selection of the amount of monomer(s) of the second group relative to the total amount of the monomers of the first group.

In this regard, it is disclosed in this reference that the use of a combination of a 3:1 ratio of trichloroacetate ester of glyceryl methacrylate and trifluoroacetate ester of glyceryl methacrylate as the monomers of the first group in combination with methyl methacrylate as the monomer of the second group provides for essentially no volume change upon solvolysis and hydration.

Notwithstanding the advantages of this approach in controlling volume change during hydration, the use of at least two different monomers of the first group each containing solvolyzable leaving groups is not always advantageous from a processing point of view and requires that each of the monomers from the first group be compatible with each other and with the monomer of the second group.

In view of the above, it would be desirable to provide for polymer compositions which contain only one monomer having solvolyzable leaving groups in combination with one or more monomers which do not.

It would also be desirable to provide for polymer compositions which upon hydration and solvolysis yield a hydrogel with little or essentially zero volume change on removal of the leaving groups so that stresses and deformations arising during hydration of the material and especially of a composite article containing this material would be minimized.

Additionally, it would be desirable for the polymer compositions to have a high water content (i.e., from about 45 to about 56 percent by weight) so that the resulting polymer would be soft and pliable and therefore particularly suited for use in ophthalmic devices such as contact lenses.

SUMMARY OF THE INVENTION

This invention is directed, in part, to the discovery of a polymer article suitable for use in ophthalmic devices at least a portion of which is manufactured from a hydrogel material having a water content after hydration of between about 45% and about 56% by weight and which hydrogel material is derived from a xerogel which undergoes minimal expansion/shrinkage upon solvolysis and hydration. In particular, the expansion/shrinkage occurring during solvolysis and hydration of the xerogel material described herein is controlled to between a linear shrinkage of no more than about 7 percent and a linear expansion of no more than about 7 percent.

Central to this invention is the use of a single specific solvolyzable and hydratable monomer in the copolymer composition described herein. Specifically, it has been found that the use of the trichloroacetate ester of glyceryl acrylate, methacrylate or ethacrylate as the single solvolyzable and hydratable monomer in a copolymer composition which has a hydration level of from about 45 to about 56 percent by weight and wherein the other monomer(s) of the copolymer composition does (do) not contain solvolyzable components permits the xerogel composition to be solvolyzed and hydrated with minimal volume change as reflected by the change in linear expansion.

Surprisingly, replacement of the trichloroacetate ester of glyceryl acrylate, methacrylate or ethacrylate with closely related solvolyzable and hydratable monomers in this polymer material does not provide for the same level of minimal change in linear expansion. For example, the use of trifluoroacetate ester of glyceryl methacrylate results in approximately a six fold increase in the amount of linear expansion occurring during solvolysis/hydration as compared to that occurring when the trichloroacetate ester of glyceryl methacrylate is employed.

In this regard, linear expansion is employed herein as a measure of volume expansion since linear expansion can be readily measured and since expansion in all directions upon solvolysis and hydration should be substantially equal. Accordingly, polymer compositions having the limited linear expansion as recited herein define compositions having acceptable volume change upon solvolysis and hydration.

In view of the above, in one of its composition aspects, this invention is directed to a xerogel copolymer composition comprising:

(a) from about 90 to about 97 weight percent of a trichloroacetate ester of glyceryl acrylate, methacrylate or ethacrylate of formula I:

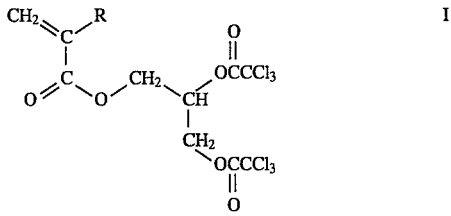

wherein R is hydrogen, methyl or ethyl; and (b) from about 0.5 to 10 weight percent of at least one compatible ethylenically unsaturated monomer free of solvolyzable leaving groups wherein, upon solvolysis and hydration, said xerogel composition will have a water content of from about 45 to about 56 weight percent and will exhibit a linear expansion of between about −7 and about +7 percent and further wherein the weight percent of each of the components is based on the total weight of the composition.

In another of its composition aspects, this invention is directed to a hydrogel copolymer composition having a water content of from about 45 to about 56 weight percent, which hydrogel is formed from a xerogel which is a copolymer system that can be solvolyzed and hydrated and which, during solvolysis and hydration, said xerogel composition will undergo a linear expansion of between about −7 and about +7 percent, wherein said composition, prior to solvolysis and hydration, comprises:

(a) from about 90 to about 97 weight percent of a trichloroacetate ester of glyceryl acrylate, methacrylate or ethacrylate of formula I:

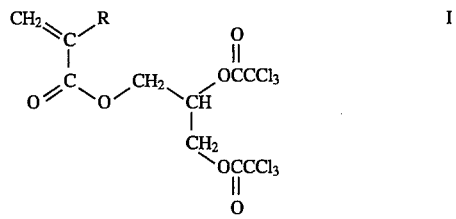

wherein R is selected from the group consisting of hydrogen, methyl or ethyl; and (b) from about 0.5 to 10 weight percent of at least one compatible ethylenically unsaturated monomer wherein said monomer is free of solvolyzable leaving groups wherein the weight percent of each of these components is based on the total weight of the composition.

In one of its method aspects, this invention is directed to a method for controlling linear expansion to between about −7 percent and about +7 percent during solvolysis and hydration of a xerogel material which material will contain between about 45 and about 56 weight percent water after hydration which method comprises:

(a) selecting a polymer composition comprising:
  (i) from about 90 to about 97 weight percent of the trichloroacetate ester of glyceryl acrylate, methacrylate or ethacrylate of formula I above; and
  (ii) from about 0.5 to 10 weight percent of at least one compatible ethylenically unsaturated monomer wherein said monomer is free of solvolyzable leaving groups; and (b) subjecting the polymer selected in (a) above to solvolysis and hydration.

In a preferred embodiment, the compositions described above further comprise a cross-linking agent in the amount of from about 0.1 to about 5 weight percent based on the total weight of the composition.

In another preferred embodiment, the hydrogel composition of this invention has from about 45 to about 55 weight percent water.

DETAILED DESCRIPTION OF THE PREFERRED EMBODIMENTS

Figure 1:
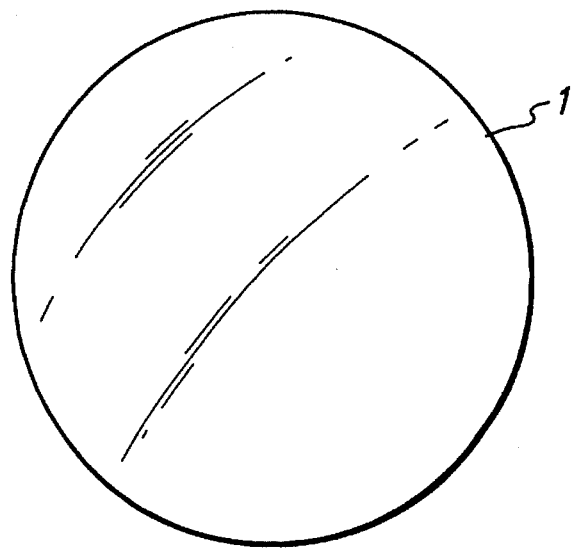
FIGS. 1, 2 and 3 illustrate three different contact lenses which incorporate either wholly or partially the hydrogel polymeric materials described herein.

This invention is directed to novel polymeric hydrogel materials useful in ophthalmic devices which materials exhibit limited linear expansion and hence minimal volume change upon solvolysis and hydration of the xerogel material to the hydrogel.

However, prior to describing this invention in further detail, the following terms will first be defined:

The term "hydrogel polymer composition" refers to the polymer compositions described herein which, after polymer formation, are hydratable when treated with water and, accordingly, can incorporate water into the polymeric matrix without itself dissolving in water. Typically, water incorporation is effected by soaking the polymer composition in a water solution for a sufficient period so as to incorporate from about 45 to about 56 weight percent water, and preferably from about 48 to about 53 weight percent water, into the polymer composition based on the total weight of the polymer composition.

The term "dry polymer composition" refers to the composition formed in the absence of added water wherein any water in the polymer composition is typically due to traces of moisture present in one or more of the reagents used to prepare the polymer composition and such moisture is typically less than 1 weight percent of the total polymer composition and preferably less than 0.1 weight percent. Such compositions are also referred to as "xerogel polymer compositions".

The term "solvolyzable" or "solvolyzable leaving groups" is used to denote groups capable of cleavage into a carboxyl containing compound and an alcohol, in the presence of a nucleophile, for example, a hydroxyl ion in water or a weak base such as ammonia or an organic amine or a $C_1$ to a $C_4$ alcohol. Preferably, the solvolyzable groups are capable of being solvolyzed under mild solvolysis conditions such as in aqueous solutions of a pH of from greater than 7 to less than about 12 and a temperature of less than about 60° C. Such solvolyzable leaving groups are well known in the art and a list of such solvolyzable leaving groups is described in, for example, European Patent Application Publication No. 0 495 603 A1, and U.S. Pat. No. 4,638,040 both of which are incorporated herein by reference in their entirety.

The term "compatible ethylenically unsaturated monomers free of solvolyzable leaving groups" refers to monomers which do not contain solvolyzable leaving groups and which can participate in polymer formation with the trichloroacetate ester of glyceryl acrylate, methacrylate or ethacrylate of formula I above to provide a polymer composition which, after solvolysis and hydration, is suitable for use in ophthalmic devices, i.e., the hydrogel polymer is clear so as to transmit visible light.

The particular compatible ethylenically unsaturated monomer free of solvolyzable leaving groups used in the polymer compositions described herein is not critical and suitable such groups include by way of example, methyl acrylate, methyl methacrylate, trifluoromethyl methacrylate, trifluoromethyl acrylate, 2',2',2'-trifluoroethyl methacrylate, 2',2',2'-trifluoroethyl acrylate, ethyl methacrylate, ethyl acrylate, styrene, and the like. Such materials are well known in the art and are either commercially available or can be prepared by methods known per se in the art.

The term "cross-linking agent" refers to a monomer containing at least two reactive groups capable of forming covalent linkages with reactive groups found on at least one of the monomers used to prepare the polymer compositions described herein. Suitable reactive groups include, for example, vinyl groups which can participate in the polymerization reaction. The reactive groups are typically substituents on a suitable backbone such as a polyoxyalkylene backbone (including halogenated derivatives thereof), a polyalkylene backbone, a glycol backbone, a glycerol backbone, a polyester backbone, a polyamide backbone, polyurea backbone, a polycarbonate backbone, and the like.

Cross-linking agents for use in the preferred compositions described herein are well known in the art and the particular cross-linking agent employed is not critical. Preferably, however, the reactive vinyl group is attached to the backbone of the cross-linking agent via an ester bond such as that found in acrylate and methacrylate derivatives such as urethane diacrylate, urethane dimethacrylate, ethylene glycol diacrylate, ethylene glycol dimethacrylate, polyoxyethylene diacrylate, polyoxyethylene dimethacrylate, and the like. However, other suitable vinyl compounds include, by way of example, di- and higher- vinyl carbonates, di- and higher-vinyl amides (e.g., $CH_2=CH-C(O)NHCH_2CH_2NH-C(O)CH=CH_2$), and the like.

Preferred cross-linking agents include, by way of example, ethylene glycol dimethacrylate, ethylene glycol diacrylate, diethylene glycol dimethacrylate, diethylene glycol diacrylate, triethylene glycol dimethacrylate, triethylene glycol diacrylate, tetradecaethylene glycol dimethacrylate, tetradecaethylene glycol diacrylate, allyl methacrylate, allyl acrylate, trimethylolpropane trimethacrylate, trimethylolpropane triacrylate, 1,3-butanediol dimethacrylate, 1,3-butanediol diacrylate, 1,4-butanediol dimethacrylate, 1,4-butanediol diacrylate, 1,6-hexanediol dimethacrylate, 1,6-hexanediol diacrylate, 1,9-nonanediol dimethacrylate, 1,9-nonanediol diacrylate, 1,10-decanediol dimethacrylate, 1,10-decanediol diacrylate, neopentyl glycol dimethacrylate, neopentyl glycol diacrylate, 2,2'bis[p-(γ-methacryloxy-β-hydroxypropoxy)phenyl] propane, pentaerythritol triacrylate, pentaerythritol trimethacrylate, pentaerythritol tetraacrylate, pentaerythritol tetramethacrylate, 1,4-cyclohexanediol diacrylate, 1,4-cyclohexanediol dimethacrylate, ethoxylated bis-phenol-A-diacrylate, ethoxylated bis-phenol-A-dimethacrylate, bis-phenol-A-dimethacrylate, bis-phenol-A-diacrylate, N,N'-methylenebisacrylamide, and the like. Such materials are well known in the art and are either commercially available or can be prepared by methods known per se in the art.

The cross-linking agent preferably has at least 2 and more preferably from 2 to about 6 vinyl functionalities and preferably has a number average molecular weight of from about 100 to about 2,500. More preferably, the vinyl functionalities are acrylate or methacrylate groups attached to a polyoxyalkylene backbone (including halogenated derivatives thereof), a polyalkylene backbone, a glycol backbone, a glycerol backbone, a polyester backbone, or a polycarbonate backbone.

Formulations

The polymer compositions described herein are prepared by first preparing a suitable formulation containing the requisite components and then polymerizing the formulation. Specifically, the formulation contains a compatible ethylenically unsaturated monomer free of solvolyzable leaving groups or a mixture of such monomers. Such compatible ethylenically unsaturated monomers are employed in an amount of from about 0.5 to about 10 weight percent and more preferably from about 5 to about 10 weight percent based on the total weight of the formulation.

The formulation also contains the trichloroacetate ester of glyceryl acrylate, methacrylate or ethacrylate which is employed at from about 90 to 97 weight percent based on the total weight of the formulation and preferably from about 90 to about 95 weight percent. These materials are known in the art (see, for example, U.S. Pat. No. 4,638,040) and can be prepared from glycidyl acrylate as follows:

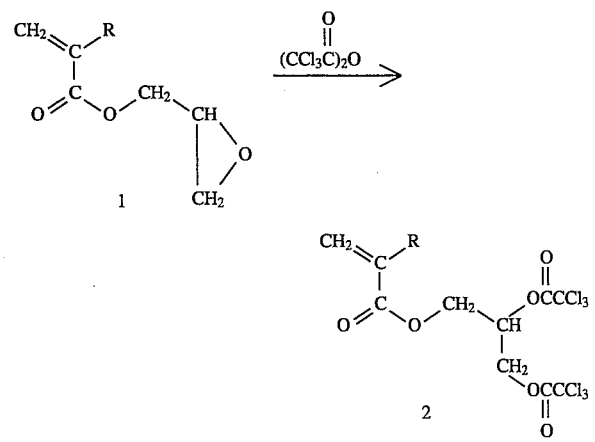

where R is as defined above. The reaction is conducted by combining at least an equimolar amount of trichloroacetic anhydride with glycidyl acrylate, methacrylate or ethacrylate 1 either neat or in an inert diluent. Suitable diluents include, by way of example, dichloromethane, chloroform, toluene, ethyl acetate, and the like. The particular inert diluent employed is not critical.

The compositions of this invention are preferably cross-linked and, accordingly, one of the components of a preferred formulation is a cross-linking agent. When employed, the cross-linking agent is employed in an amount sufficient to provide a cross-linked product but preferably is employed in an amount of from about 0.1 to about 5 weight percent and more preferably from about 0.35 to about 3.20 weight percent based on the total weight of the formulation.

The reaction is conducted under conditions sufficient to provide for conversion of epoxide 1 to the di-trichloroacetate ester 2. Preferably the reaction is conducted at a temperature of from about 0° to about 50° C. for a period of time of from about 6 to about 50 hours. In a further preferred embodiment, the reaction is conducted under substantially anhydrous conditions in an inert atmosphere, e.g., argon, nitrogen, etc. and at a temperature of from about 0° C. to about 30 ° C.

After reaction completion, the product is recovered by conventional methods which do not result in hydrolysis of the ester groups. Suitable methods include, by way of example, stripping, etc.

The formulation can optionally contain one or more additional components such as initiators, colorants, etc. which are conventionally employed in the art.

These formulations as well as the reagents employed to prepare these formulations are preferably stored and formulated in containers which prevent premature polymerization of one or more of the reagents. For example, the use of amber bottles for storing reagents inhibits photo-induced polymerization.

Methodology

The formulations described above are readily polymerized by conventional techniques such as thermal, UV, γ irradiation, or electron beam induced polymerization to provide for the polymer composition. For example, thermal induced polymerization can be achieved by combining a suitable polymerization initiator into the mixture of monomers under an inert atmosphere (e.g., argon) and maintaining the mixture at an elevated temperature of from about 20° C. to about 75° C. for a period of time from about 1 to about 48 hours.

Ultraviolet (UV) induced polymerization can be achieved by combining a suitable polymerization initiator into the mixture of monomers under an inert atmosphere (e.g., argon) and maintaining the mixture under a suitable UV source. Preferably, UV induced polymerization is conducted at ambient conditions for a period of from about 5 minutes to about 24 hours.

Suitable polymerization initiators are well known in the art including thermal initiators such as t-butyl peroxy pivalate (TBPP), t-butyl peroxy neodecanoate (TBPN), benzoyl peroxide, methyl ethyl ketone peroxide, diisopropyl peroxycarbonate and the like and UV initiators such as benzophenone, Darocur 1173 (available from Ciba Geigy, Ardsley, N.Y., U.S.A.), bis-azoisobutyronitrile and the like.

The particular thermal or UV initiator employed is not critical and sufficient initiator is employed to catalyze the polymerization reaction. Preferably, the initiator is employed at up to about 1 weight percent based on the total weight of the composition.

Polymerization achieved by either electron beams or γ irradiation does not require the use of an initiator and the formulation to be polymerized is merely exposed to the electron beam or γ irradiation using conventional methods.

Polymerization is typically conducted in a manner so as to facilitate manufacture of the finished contact lens. For example, polymerization can be conducted in molds which correspond to the structure of the contact lens. Alternatively, polymerization can be conducted so as to form a polymer rod which can be machined (lathed) to provide contact lenses of suitable dimensions. In this latter embodiment, polymerization is conducted in a silylated glass test tube and after polymerization, the test tube is broken to provide for the polymeric rod. The rod, in the form of the xerogel, can be machined, for example, lathed, cut, milled, and consequently, the rod can be made into contact lens by cutting small cylinders or buttons from the rod and subsequent lathing.

As noted above, in one embodiment illustrated in FIG. 1, the xerogel polymeric materials described above are used to prepare a first type of contact lens 1 made in accordance with the claimed invention. The contact lens 1 comprises a solid section of one of the compositions exemplified in the examples below.

Figure 2:
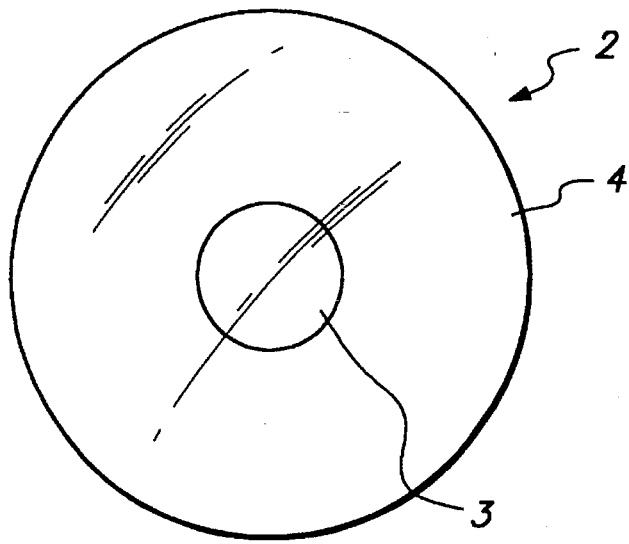

In another embodiment illustrated in FIG. 2, the xerogel polymeric materials described herein are used to prepare a second type of contact lens 2 wherein the lens comprises a central section 3 which is made from a standard rigid gas permeable material, for example, Fluorperm® (available from Paragon Vision Science, Phoenix, Ariz., U.S.A., a division of Pilkington Barnes Hind, Sunnyvale, Calif., U.S.A.), that is circumferentially surrounded by an outer skirt of hydrogel material 4.

Such compositions can be readily prepared by conventional methods which include, for example, drilling a hole into the center of a polymer rod comprising the xerogel material, adding the monomer precursor(s) of the to-be-formed polymer characterized as a rigid gas permeable material to this hole, polymerizing the monomers and then processing the resulting rod in a conventional manner. Alternatively, the rigid gas permeable center core can be formed first followed by polymerization of the xerogel material around this center core.

Figure 3:
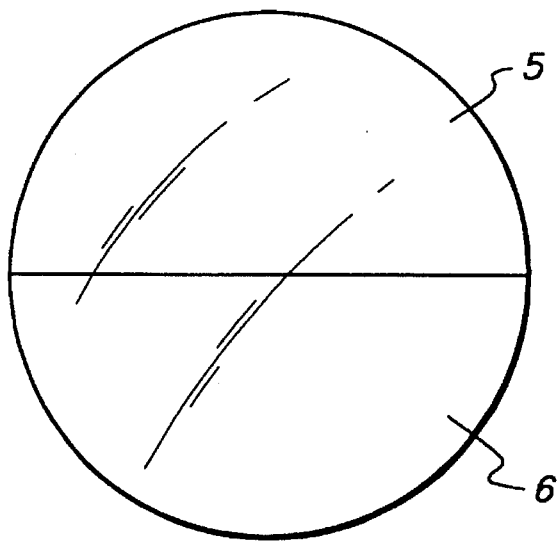

In still another embodiment illustrated in FIG. 3, the xerogel polymeric materials described herein are used to prepare a third type of contact lens where two soft hydrogel materials are bonded together to produce a soft-soft contact lens. This lens is formed by combining two different xerogel materials 5 and 6 by conventional methods wherein each material has different refractive indices.

In a preferred embodiment, an adhesion layer can be interposed between materials 5 and 6 to improve the adhesion of these materials. In one embodiment, the adhesion layer is formed by addition of a polymerizable monomer to the boundary surface of material 5 which monomer is miscible with the polymeric material 5 and interpenetrates at least the top surface of material 5. Suitable such materials include methyl methacrylate, methyl acrylate, and the like. The monomers of the to-be-formed polymeric material 6 are then added and polymerized. Interpenetration of miscible monomer into polymer material 5 and subsequent polymerization results in strong adhesion between polymer materials 5 and 6.

In another embodiment, a direactive substituent is employed which permits covalent binding between materials 5 and 6. Specifically, such difunctional materials would include a reactive substituent which can react with a substituent on polymeric material 5 and a different reactive substituent which can react with polymeric material 6.

In still another embodiment, the methods disclosed by Thakrar, et al., U.S. patent application Ser. No. 07/944,891 can be used to enhance the stability of a composite lens such as that shown in FIGS. 2 and 3. The disclosure of this application is incorporated herein by reference in its entirety.

In any event, after polymerization, a post-curing procedure is optionally employed to complete the polymerization process which post-curing step typically increases the hardness of the polymer. The post-curing procedure can comprise heating the polymer to a temperature of from about 60° C. to 120° C. for a period of from about 2 to about 24 hours. Alternatively, the post-curing step can employ γ irradiation of from about 0.1 to about 5 Mrad. Combinations of these two procedures can also be employed.

The polymer compositions described above, preferably in contact lens forms described, are then subjected to solvolysis and hydrolysis. Solvolysis is conducted for the purpose of hydrolyzing the ester bonds of the trichloroacetate ester to form carboxyl residues and alcohol residues. Solvolysis is preferably conducted by suspending the contact lens in an aqueous solution in the presence of a nucleophile, for example, a hydroxyl ion in water or a weak base such as ammonia or an organic amine or a $C_1$ to a $C_4$ alcohol. Preferably, the solvolyzable groups are capable of being solvolyzed under mild solvolysis conditions such as in aqueous solutions of a pH of from greater than 7 to less than about 12 and a temperature of from about 10° C. to about 60° C.

Under these conditions, hydration of the polymer material will also occur. However, if desired, a separate hydration step can be employed. Hydration is continued until the polymer composition is fully hydrated which, in the present case, means that the water content of the hydrogel is from about 45 to about 56 weight percent.

Utility

The xerogel polymer compositions described herein are suitable for use in medical and non-medical applications such as water absorbent materials useful in a variety of applications. After water incorporation, the polymer compositions described herein are particularly suitable for use in ophthalmic devices such as contact lenses providing requisite water content, high strength, no deterioration over time, relatively slow release of hydrated water upon exposure to air, and good optical properties including transparency.

When formed into contact lenses, the lenses are typically dimensioned to be from about 0.02 to about 0.15 millimeters in thickness and preferably from about 0.05 to about 0.10 millimeters in thickness.

The hydrogel compositions described herein have the distinct advantage over what is freely available nowadays, in that upon solvolysis and hydration, it exhibits little or essentially no change in linear expansion and hence little or no change in volume after hydration to a water content of from about 45 to about 56 weight percent (e.g., 50 weight percent water). This feature enables substantial stress and distortion in articles made therefrom to be avoided.

Consequently, the problems associated with the degree of dimensional changes associated with the freely available hydrogels as detailed above are to a very significant extent alleviated and the articles, particularly contact lenses and other devices requiring accurate manufacture and transfer to the hydrogel state from the xerogel state, become easier to manufacture.

The invention will now be illustrated by way of examples which are provided for the purpose of illustration only and are not intended to be limiting in the present invention.

EXAMPLES

In the following examples, the following abbreviations represent the following:

| |
|---|
| cm = centimeter |
| EGDMA = ethylene glycol dimethylacrylate |
| EWC = equilibrium water content |
| Esperox 33 ® = t-butylperoxyneodecanoate |
| g = grams |
| LE = linear expansion |
| mm = millimeter |
| MMA = methyl methacrylate |

In the examples set forth below, polymer compositional values are set forth for the Equilibrium Water Content and linear expansion. Unless otherwise indicated, these values were determined as follows:

Measurement of Equilibrium Water Content

Equilibrium Water Content (EWC) is determined by soaking the polymer samples in phosphate buffered saline solution for overnight. The samples are removed, lightly blotted dry with a tissue and subsequently weighed. The hydrated samples are then placed in a vacuum oven at 60° C. overnight. The next day, the sample is reweighed. Equilibrium Water Content is calculated using the following equation:

$$EWC = \frac{X - Y}{X} \times 100\%$$

where

X=mass of hydrated polymer
Y=mass of dehydrated polymer

The EWC is sometimes referred to herein as % water.

Measurement of Percent Linear Expansion

Linear Expansion is determined by measuring the diameter of the dry polymer sample using the Nikon Profile Projector V-12 (available from Nippon Kogaku K.K., Tokyo, Japan). The sample is hydrolyzed in $NH_4OH$ and then soaked overnight in phosphate buffered saline solution. The diameter is subsequently remeasured in phosphate buffered saline. Percent Linear Expansion is calculated using the following equation:

$$LE = \frac{X}{Y} \times 100$$

where

X=hydrated polymer diameter
Y=Initial (dry) polymer diameter

Example 1

A mixture of di-trichloroacetate ester of glyceryl methacrylate, 91.58 g (compound 2) and trifluoroethylmethacrylate, 7.97 g, with ethyleneglycol dimethacrylate, 0.35 g, as the cross-linking agent was prepared and the mixture was stirred for 30 minutes. After degassing the mixture for 30 seconds in bubbling Argon, 0.10 g of Esperox 33® initiator (available from Lucidol, Crosby, Tex., U.S.A.) was added. The mixture was transferred to a silylated glass tube and polymerized in a water bath maintained at 35° C. for 24 hours. The partially polymerized material was transferred to an oven maintained at 70° C. and allowed to cure for 48 hours. The polymer was allowed to cool slowly in the oven till it reached room temperature. The glass tubes were broken and the colorless transparent polymer was removed. Disks (0.2–0.5 mm in thickness) were cut from the material and hydrolyzed in aqueous $NH_4OH$ for 24 hours. After equilibrating the disks in saline for another 24 hours, its linear expansion was measured. It was found that disk expanded in the linear direction an average of 2% in diameter. The percentage hydration was 48% (see Table 1).

Examples 2–7

The procedures of Example 1 were repeated as before with different ratios of monomers and cross-linking agent as given in Table 1. The percent hydration varied from 47% to 56% with linear expansions 0% to 6%.

Examples 8–11

The reactions were repeated in exactly the same reaction conditions as in Example 1 above except that in these examples the ratio of the monomers was varied along with the nature of the crosslinkers as given in Table 1. The percent hydration varied from 52% to 53% with linear expansions 1% to 3%.

Example 12

The reaction was repeated using exactly the same reaction conditions as in Example 1 above except that the percent of hydration in this example was limited to 45% with linear expansion –(minus) 4.1% (i.e. the copolymer system shrunk upon hydration).

TABLE

| Ex. No. | Monomer A | Monomer B | Cross-linker | Initiator | EWC | % LE |
|---|---|---|---|---|---|---|
| 1. | 91.58 | 7.97 | 0.35 | 0.10 | 48 | 2 |
| 2. | 92.44 | 6.95 | 0.50 | 0.10 | 49 | 3 |
| 3. | 95.42 | 3.98 | 0.50 | 0.10 | 56 | 6 |
| 4. | 94.50 | 3.94 | 1.50 | 0.10 | 54 | 6 |
| 5. | 96.42 | 0.97 | 2.50 | 0.10 | 54 | 4 |
| 6. | 93.50 | 3.90 | 2.50 | 0.10 | 47 | 0 |
| 7. | 94.47 | 3.94 | 1.50 | 0.10 | 50 | 3 |
| 8. | 94.08 | 3.92 | 1.90 | 0.10 | 52 | 1 |
| 9. | 92.83 | 3.87 | 3.20 | 0.10 | 52 | 3 |
| 10. | 93.73 | 3.90 | 2.26 | 0.10 | 52 | 3 |
| 11. | 95.03 | 3.95 | 0.91 | 0.10 | 53 | 2 |
| 12. | 94.15 | 3.84 | 1.82 | 0.10 | 45 | –4 |

Monomer A = di-trichloroacetate ester of glyceryl methacrylate
Monomer B = trifluoroethylmethacrylate
Crosslinker = ethylene glycol dimethylacrylate
= 1,4-Cyclohexanediol dimethacrylate (Example 8)
= Ethoxylated bis-phenol-A-diacrylate (Examples 9 and 10)
= bis-Phenol-A-dimethacrylate (Examples 11 and 12)
Initiator = Esperox 33 ®

The values reported in Table 1 for Monomer A, Monomer B, initiator, and cross-linker are percent by weight based on the total weight of the composition.

Examples 13 to 15

This reaction was repeated in exactly the same reaction conditions as before. However, this time the di-trichloroacetate ester of glyceryl methacrylate was copolymerized with methyl methacrylate at 35° C. and cured at 70° C. for 48 hours in silylated glass tubes. After breaking the glass tubes, the material was isolated and disks were cut from the stress free, colorless, transparent and bubble free rods. These 0.2 mm to 0.5 mm thick disks were hydrolyzed in 5% $NH_4OH$ solution for 24 hours. Later they were transferred to a saline solution and allowed to equilibrate for 24 to 48 hours. Their expansions were measured upon hydration. It was found that the disk had a linear expansion on average of 2% to 7% in diameter. The percentage hydration was 48% to 53% (Table 2).

TABLE 2

| Ex. No. | Monomer A | Monomer B | Cross-linker | Initiator | EWC | % LE |
|---|---|---|---|---|---|---|
| 13 | 89.98 | 9.57 | 0.35 | 0.10 | 48 | 2 |
| 14 | 90.74 | 8.80 | 0.35 | 0.10 | 51 | 4 |
| 15 | 91.39 | 8.16 | 0.35 | 0.10 | 53 | 7 |

Monomer A = di-trichloroacetate ester of glyceryl methacrylate
Monomer B = methyl methacrylate
Crosslinker = ethylene glycol dimethylacrylate
Initiator = Esperox 33 ®

13

The values reported in Table 2 for Monomer A, Monomer B, initiator, and cross-linker are percent by weight based on the total weight of the composition.

The above results demonstrate that the hydrogel polymer compositions of this invention achieve a high water content of from about 45 to about 56% water while showing minimal linear expansion for the hydrated polymer as compared to the xerogel before hydration, i.e., a maximum linear expansion of about ±7%.

Example 16 and Comparative Example A

The purpose of these examples is to illustrate that the use of di-trifluoroacetate ester of glyceryl methacrylate as the solvolyzable and hydratable monomer fails to provide for adequate volume control during hydration as compared to the di-trichloroacetate ester of glyceryl methacrylate.

Specifically, the reaction of Example 1 was repeated in exactly the same reaction conditions as before. However, this time the di-trichloroacetate ester or di-trifluoroacetate ester of glyceryl methacrylate was copolymerized with methyl methacrylate at 35° C. and cured at 70° C. for 48 hours in silylated glass tubes. After breaking the glass tubes, the material was isolated and disks were cut from the stress free, colorless, transparent and bubble free rods. These 0.2 mm to 0.5 mm thick disks were hydrolyzed in 5% $NH_4OH$ solution for 24 hours. Later they were transferred to a saline solution and allowed to equilibrate for 24 to 48 hours. Their expansions were measured upon hydration. It was found that the disk obtained from di-trichloroacetate ester of glyceryl methacrylate had a linear expansion of about 2% whereas the disk obtained from di-trifluoroacetate ester of glyceryl methacrylate had a linear expansion of about 12%. As shown in Table 3 below, the percentage hydration in each case was about 51%.

TABLE 3

| Example No. | Monomer A | Monomer B | Cross-linker | Init. | EWC | % LE |
|---|---|---|---|---|---|---|
| 16 | 0.125 | 2.34 | 1.35 | 0.10 | 51 | 2 |
| Comp. A | 0.125 | 2.34 | 1.35 | 0.10 | 51 | 12 |

Monomer A = di-trichloroacetate ester of glyceryl methacrylate (Example 16)
= di-trifluoroacetate ester of glyceryl methacrylate (Comp. Ex. A)
Monomer A is reported in number of moles employed
Monomer B = 2',2',2'-trifluoroethyl methacrylate
Crosslinker = ethylene glycol dimethylacrylate
Initiator = Esperox 33 ®
Monomer B, Crosslinker and Initiator are reported in weight percent based on the total weight of the composition.

The above data demonstrates that substitution of the di-trichloroacetate ester of glyceryl methacrylate with the di-trifluoroacetate ester of glyceryl methacrylate under otherwise identical conditions resulted in approximately a 6 fold increase in linear change upon solvolysis and hydration.

What is claimed is:

1. A hydrogel copolymer composition having a water content of from about 45 to about 56 weight percent, which hydrogel is formed from a xerogel which is a copolymer system that can be solvolyzed and hydrated and which, during solvolysis and hydration, said xerogel composition will undergo a linear expansion of between about −7 and about +7 percent, wherein said composition, prior to solvolysis and hydration, comprises:

(a) from about 90 to about 97 weight percent of a single trichloroacetate ester as the only solvolyzable monomer employed which trichloroacetate ester is selected from the group consisting of glyceryl acrylate, methacrylate and ethacrylate of formula I:

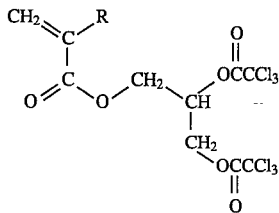

wherein R is selected from the group consisting of hydrogen, methyl and ethyl; and (b) from about 0.5 to 10 weight percent of at least one compatible ethylenically unsaturated monomer wherein said monomer is free of solvolyzable leaving groups wherein the weight percent of each of these components is based on the total weight of the composition.

2. The hydrogel polymer composition as defined in claim 1 wherein said composition further comprises from about 0.1 to about 5 weight percent of a cross-linking agent.

3. The hydrogel polymer composition as defined in claim 2 wherein said cross-linking agent is selected from the group consisting of 1,4-cyclohexanediol dimethacrylate, ethoxylated bis phenol-A-diacrylate, bis phenol-A-diacrylate, tetraethyleneglycol dimethacrylate.

4. The hydrogel polymer composition as defined in claim 2 wherein the compatible ethylenically unsaturated monomer free of solvolyzable leaving groups is selected from the group consisting of methyl acrylate, methyl methacrylate, trifluoromethyl acrylate, trifluoromethyl methacrylate, 2',2', 2'-trifluoroethyl methacrylate, 2',2',2'-trifluoroethyl acrylate, ethyl acrylate, and ethyl methacrylate.

5. The hydrogel polymer composition as defined in claim 2 wherein R is methyl.

6. The hydrogel polymer composition as defined in claim 2 wherein said polymer forms all or part of a contact lens.

7. The contact lens as defined in claim 6 wherein said contact lens comprises a central section which is made from a rigid gas permeable material that is circumferentially surrounded by a skirt of said hydrogel polymer composition.

8. The contact lens as defined in claim 6 wherein the contact lens is made from two materials which are cojoined and have different refractive indices.

9. The contact lens as defined in claim 6 wherein the lens is made solely from said hydrogel material.

10. A method for controlling linear expansion to between about −7 percent and about +7 percent during solvolysis and hydration of a xerogel material which material will contain between about 45 and about 56 weight percent water after hydration which method comprises:

(a) selecting a polymer composition comprising:

(i) from about 90 to about 97 weight percent of a single trichloroacetate ester as the only solvolyzable monomer employed which trichloroacetate ester is selected from the group consisting of glyceryl acrylate, methacrylate and ethacrylate of formula I:

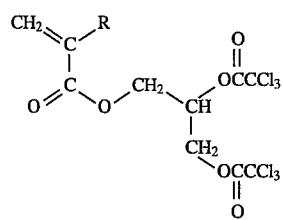

wherein R is selected from the group consisting of hydrogen, methyl and ethyl; and (ii) from about 0.5 to 10 weight percent of at least one compatible ethylenically unsaturated monomer wherein said monomer is free of solvolyzable leaving groups; and (b) subjecting the polymer composition selected in (a) above to solvolysis and hydration.

11. The method as defined in claim 10 wherein said polymer composition further comprises from about 0.1 to about 5 weight percent of a cross-linking agent.

12. The method as defined in claim 11 wherein said cross-linking agent is selected from the group consisting of 1,4-cyclohexanediol dimethacrylate, ethoxylated bis phenol-A-diacrylate, bis phenol-A-diacrylate, tetraethyleneglycol dimethacrylate.

13. The method as defined in claim 11 wherein the compatible ethylenically unsaturated monomer free of solvolyzable leaving groups is selected from the group consisting of methyl acrylate, methyl methacrylate, trifluoromethyl acrylate, trifluoromethyl methacrylate, 2',2',2'-trifluoroethyl methacrylate, 2',2',2'-trifluoroethyl acrylate, ethyl acrylate, and ethyl methacrylate.

14. The method as defined in claim 10 wherein R is methyl.

* * * * *